July 30, 1968  R. H. MacKAY  3,395,267
SEALED AND REMOVABLE ELECTRICAL HEATER ASSEMBLY
Filed March 21, 1966  3 Sheets-Sheet 1

INVENTOR
ROBERT H. MACKAY
by JEFFERS & YOUNG
ATTORNEYS

July 30, 1968  R. H. MacKAY  3,395,267
SEALED AND REMOVABLE ELECTRICAL HEATER ASSEMBLY
Filed March 21, 1966  3 Sheets-Sheet 2

INVENTOR
ROBERT H. MACKAY
by JEFFERS & YOUNG
ATTORNEYS

July 30, 1968   R. H. MacKAY   3,395,267
SEALED AND REMOVABLE ELECTRICAL HEATER ASSEMBLY
Filed March 21, 1966   3 Sheets-Sheet 3

INVENTOR
ROBERT H. MACKAY
By JEFFERS & YOUNG
ATTORNEYS 3,395,267
SEALED AND REMOVABLE ELECTRICAL
HEATER ASSEMBLY
Robert H. MacKay, Fort Wayne, Ind., assignor to Lincoln Manufacturing Company, Fort Wayne, Ind., a corporation of Indiana
Filed Mar. 21, 1966, Ser. No. 535,949
5 Claims. (Cl. 219—544)

ABSTRACT OF THE DISCLOSURE

A U-shaped, sealed heater is provided with heating elements in the legs and with sealed terminals in the cross-member. The terminals are internally connected to the heating elements, and are arranged to be externally connected to an electrical energizing circuit.

---

The invention relates to a sealed electrical heater assembly, and particularly to such a heater assembly that efficiently heats a chamber, and that can be easily removed from and placed in such a chamber.

Electrical heaters are used in many applications where clean, efficient heat is needed. For example, portable food carts or cabinets are used to transport hot food from a kitchen to a dining hall or to individual patients in a hospital. The desirability of keeping the food warm or hot is obvious. It is also desirable that the cart or cabinet be easily cleaned with cleansers or disinfectants, including hot, strong liquids. This cleaning includes the heater, so that the heater should be easily removable and should withstand the same cleansers as the cart or cabinet.

Accordingly, an object of the invention is to provide an improved electrical heater assembly that can be easily removed from or inserted in its heating location or position.

Another object of the invention is to provide an electrical heater assembly that is constructed to withstand rigorous cleaning, particularly with hot, strong liquids.

Because of its cleanliness and convenience, electrically produced heat is very desirable. But, the cost of producing such heat should be kept as low as possible. And, the electrical heater should be easy to put into or out of operation, because relatively unskilled personnel may operate the heater.

Accordingly, another object of the invention is to provide a sealed electrical heater assembly that produces heat relatively efficiently for closed chambers, such as a food cart.

Another object of the invention is to provide an electrical heater assembly that can be easily and simply put into and out of operation.

Another object of the invention is to provide an improved electrical heater assembly that has a sealed construction, that can be easily removed from and inserted into its heating position, and that can be easily and simply connected to and disconnected from a source of electrical power.

Briefly, these and other objects are achieved in accordance with the invention by a heater assembly that has a generally U-shaped housing. The housing is preferably formed from a hollow, elongated, metal pipe that is bent into a U-shape with two parallel legs and a cross-member that joins the two legs. Heater elements are positioned in each of the two legs, which are then sealed. An electrical terminal structure is mounted on the cross-member to provide insulated electrical connections between the interior of the cross-member and external circuits. The two heater elements are connected to the electrical terminal on the interior of the housing. A thermostat may be provided in this connection. The housing is preferably dimensioned so that its two legs are near or adjacent opposite walls of the chamber to be heated so as to provide efficient heating. The terminal structure passes through an opening in a chamber wall connecting the two opposite chamber walls to position or support the heater assembly; and to provide means for connecting the heater assembly to a source of electrical power without the chamber being opened.

The invention may be better understood from the following description given in connection with the accompanying drawing. The scope of the invention will be pointed out in the claims. In the drawing:

Figure 1:
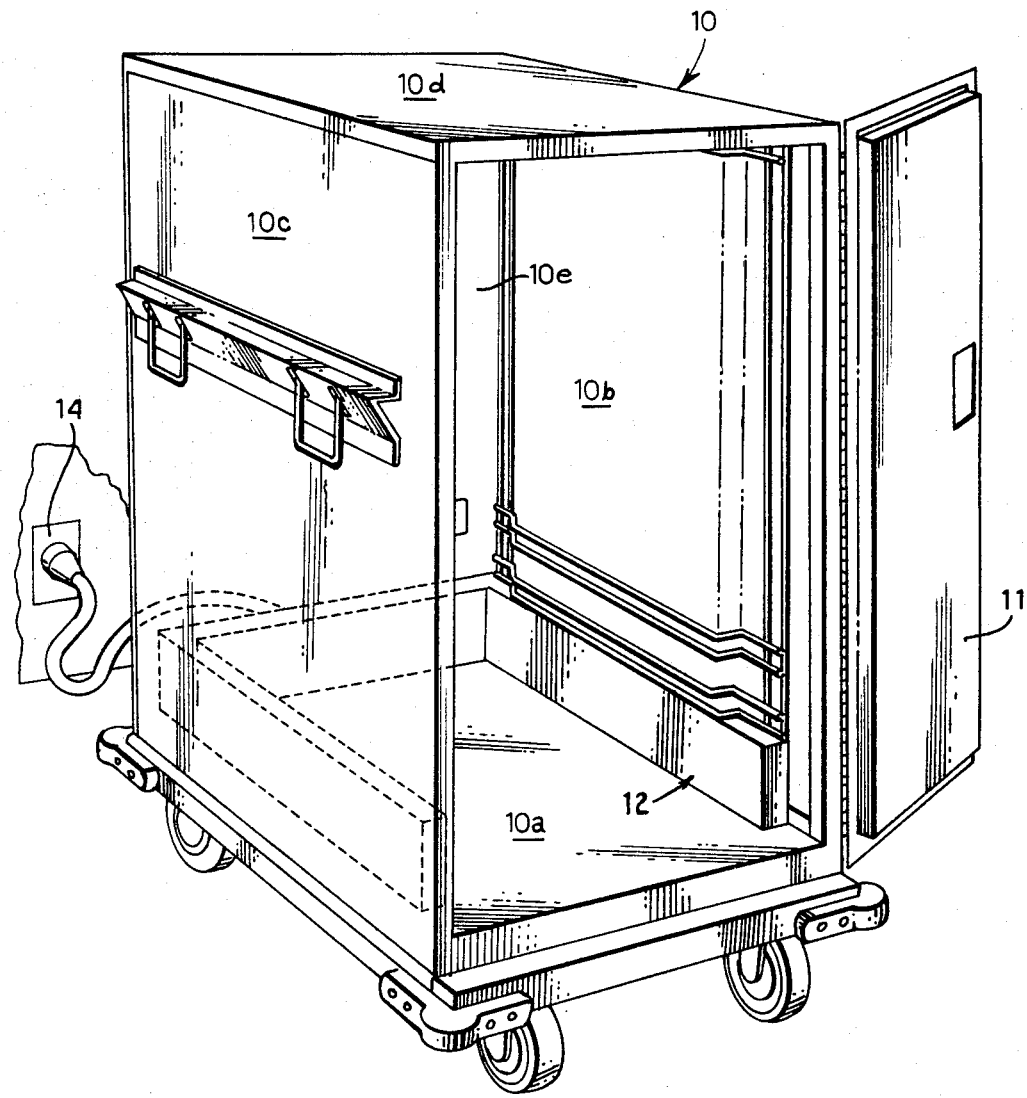
FIGURE 1 shows a perspective view of a hot food cart that utilizes a heater assembly in accordance with the invention.

FIGURE 1 shows a perspective view of a portable hot food cart 10 which has been selected as an example of a chamber which can be heated in accordance with the invention. It is to be understood that the invention can be used with other types of chambers equally well and equally efficiently, such as a permanently located chamber. Since the cart 10 is assumed to be portable, it may be rolled on wheels from one location to another. This cart includes four sides or walls 10a, 10b, 10c, 10d and an end 10e which are joined to form a rectangular chamber or cavity. A door 11, suitably hinged, is provided at one end of the cart 10 so that food can be placed in or removed from the cart 10. It has also been assumed that the cart 10 requires one heater assembly 12 in accordance with the invention. This heater assembly 12 is connected through external wires to a source of electrical power, such as the conventional wall socket 14, shown. However, it is to be understood that more or less heater assemblies may be provided in any given application. The number of such heater assemblies depends upon the size of the cart or chamber to be heated. As shown, the main plane of the heater assembly 12 is generally U-shaped and is positioned on or near the floor 10a of the cart 10. The two legs of the U-shape are in contact with or near the opposite vertical walls 10b, 10c of the cart 10, and the cross-member of the U-shape is in contact with or near the closed end 10e of the cart 10. In accordance with the invention, it has been found that this U-shaped construction provides efficient heating for the cart 10; permits the heater assembly 12 to be easily inserted in or removed from the cart 10; and permits electrical power leads to be easily connected to or disconnected from the heater assembly 12 from the outside of the cart 10. Also, it is to be understood that the heater assembly 12 may be positioned against other walls of the cart 10. For example, the legs of the U-shaped assembly 12 may be positioned adjacent the top wall 10d and the bottom wall 10a of the cart 10 and the cross-member of the assembly 12 may be positioned adjacent one of the vertical walls 10b, 10c of the cart 10.

Figure 2:
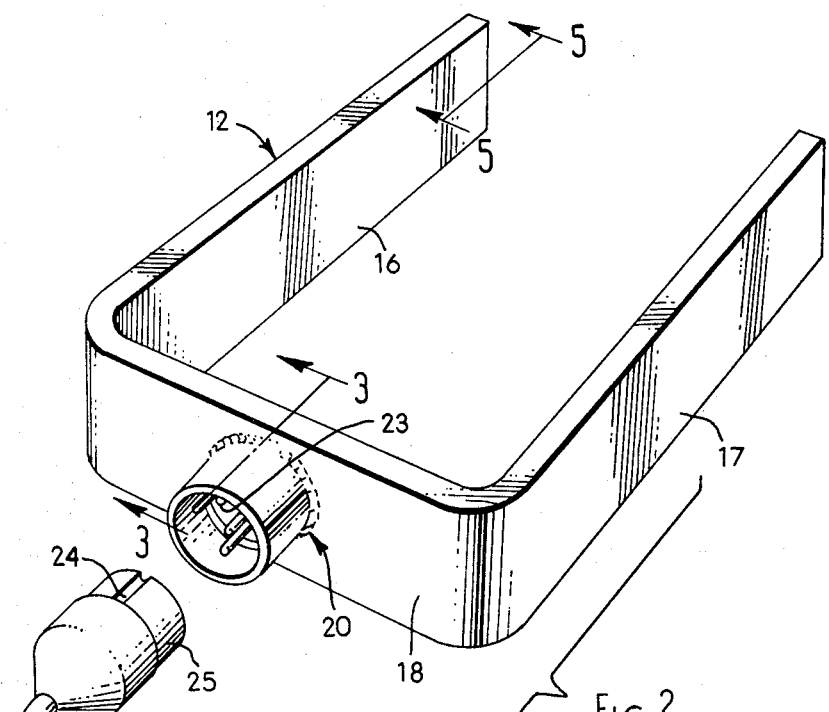
FIGURE 2 shows a perspective view of a preferred embodiment of a heater assembly in accordance with the invention.

FIGURE 2 shows a perspective view of a preferred embodiment of the heater assembly 12 shown in FIGURE 1. The heater assembly 12 comprises a generally U-shaped housing structure formed of an enlarged hollow piece of metal, such as aluminum, that has a rectangular cross-section. The metal is bent so as to form two legs 16, 17 which are generally parallel, and which are joined at one end by a cross-member 18. The legs 16, 17 and the cross-member 18 are preferably formed of a single piece of metal, although three separate pieces of metal may be joined by any suitable means such as welding. A terminal structure 20 is provided approximately at the center and outer face of the cross-member 18 for providing electrical connections between the interior of the assembly 12 and an external electrical circuit. The terminal structure 20 comprises a cylindrical ring 21 which surrounds one or more male terminal members 22a, 22b, 22c. The cylindrical ring 21 protects these terminal members and also provides a mounting structure for the assembly 12. A key 23 is also provided for engaging a slot 24 in a plug 25 to insure that proper electrical connections are made to the plug 25. The plug 25 carries correspondingly positioned female members (not shown) which engage the male terminal members 22a, 22b, 22c and provide connections from these terminal members to a plug or connection 26. The plug 26 is to be connected to a source of electrical power.

Figures 3, 4:
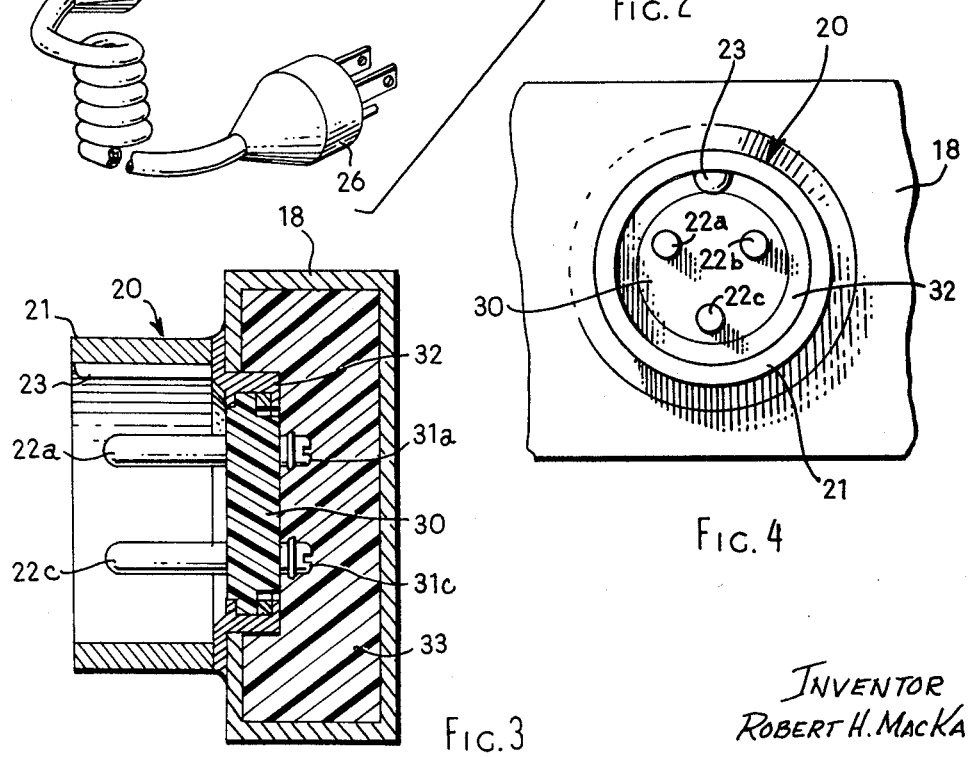
FIGURE 3 shows a cross-sectional view of the heater terminal structure taken along the lines 3—3 in FIGURE 2.
FIGURE 4 shows an external end view of the heater terminal structure.

FIGURE 3 shows a cross-sectional view, taken along the lines 3—3 in FIGURE 2, of the terminal structure 20. FIGURE 4 shows an end view, looking at the bottom exterior surface of the cross-member 18, and shows further details of the terminal structure 20. The terminal members 22a, 22b, 22c are rigidly fastened to a circular insulating member 30, and pass through this member 30 and terminate on screws or other comparable fastening members 31a, 31b, 31c respectively, to provide internal connections to the heater elements. The insulating member 30 is rigidly mounted in a cylindrical, metallic ring 32 which is placed in a circular hole or opening in the lower or outer face wall of the cross-member 18 and welded or otherwise fastened thereto. The junctions of the terminal members 22a, 22b, 22c and the insulating member 30 are sealed or constructed to provide a watertight construction. Likewise, watertight constructions are provided between the member 30 and the ring 32, and between the ring 32 and the cross-member 18. Thus, no water or liquid, and preferably no gas, can pass through the terminal structure 20 between the interior of the cross-member 18 and the outside. The ring 21 may be welded or fastened as shown to protect the terminal members 22a, 22b, 22c, and to prvide a mounting or positioning structure for the heater assembly 12. After connections have been made to the fastening members 31a, 31b, 31c, as will be explained, the cross-member 18 may be filled (totally or partially) with any suitable, and preferably heat resistant, potting electrical insulating material 33.

Figure 5:
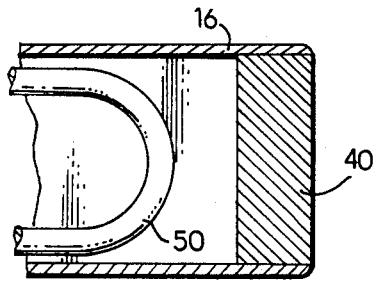
FIGURE 5 shows a cross-sectional view of one end of a leg forming the heater assembly taken along the lines 5—5 in FIGURE 2.

FIGURE 5 shows a cross-sectional view taken along the lines 5—5 in FIGURE 2 to show how the ends of the legs 16, 17 may be sealed. A rectangularly shaped metal block 40, such as aluminum, is inserted into the end of the leg 16 and sealed thereto by any suitable means such as welding. FIGURE 5 also shows the upper or outer end of a heater element 50, and shows that the heater element 50 preferably extends almost to the sealing block 40. While not shown, a corresponding sealing block and heater element are provided in the leg 17.

Figure 6:
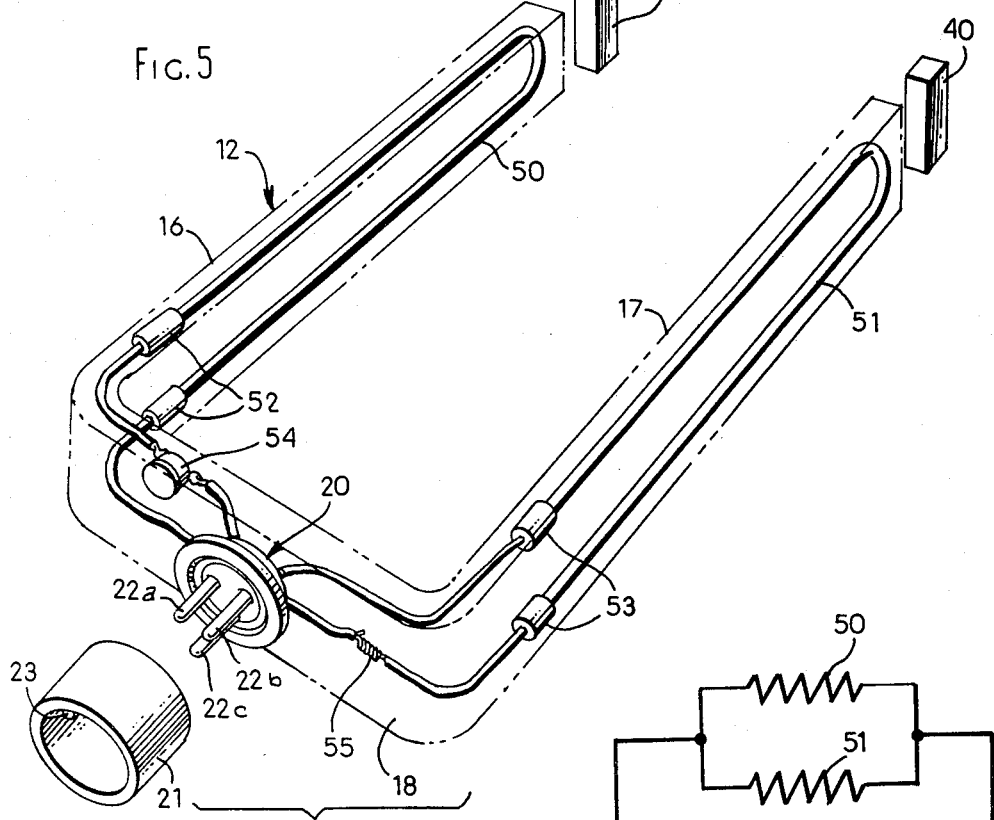
FIGURE 6 shows an exploded, perspective view, with the housing in phantom, of a heater assembly in accordance with the invention.

FIGURE 6 shows an exploded, perspective view of the heater assembly 12. The parallel leg members 16, 17 and the cross-member 18 are shown in phantom so that the interior heater elements can be seen. A respective heater element 50 is provided in the leg 16, and a respective heater element 51 is provided in the leg 17. These heater elements 50, 51 are elongated, also preferably U-shaped or hairpin shaped structures. The elements 50, 51 may comprise any known resistance heaters, such as used on electric stoves. The heater element 50 terminates on terminals 52, which seal the heater element 50; and the heater element 51 terminates on terminals 53 which also seal the heater element 51. The heater elements 50, 51 are shaped to occupy substantially all of their respective leg members 16, 17. In FIGURE 6, it has been assumed that each of the heater elements 50, 51 are designed to operate on conventional 115 volt, 60 cycle alternating current power. It has also been assumed that the heater assembly 12 in FIGURE 6 is to be operated from conventional 230 volt, 60 cycle alternating current power. Accordingly, the heater elements 50, 51 are connected in series. This connection is made by a wire connected from the terminal member 22a (actually its corresponding internal fastening member 31a which is shown in FIGURE 3) to one side of a thermostatic switch 54. The other side of the thermostatic switch 54 is connected to the upper terminal 52 of the heater element 50. The lower terminal 52 of the heater element 50 is connected, as by wires with a splice 55, to the lower terminal 53 of the heater element 51. The upper terminal 53 of the heater element 51 is connected to an internal fastening member 31b (not shown) which connects to the terminal member 22b. For this series connection, the terminal member 22c may be connected to the metallic pieces forming the heater assembly 12 for grounding.

Figure 7:
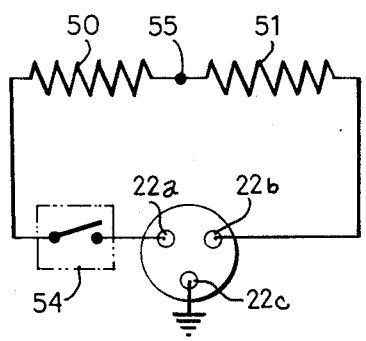
FIGURE 7 shows an electrical circuit of the heater elements and thermostat in FIGURE 6.

FIGURE 7 shows the electrical circuit for the connections shown in FIGURE 6. This circuit comprises the thermostatic switch 54, the heater element 50, the splice 55, and the heater element 51 connected in series between the terminal members 22a, 22b. When power is to be applied to the heater assembly 12, a plug, such as the plug 25 shown in FIGURE 2, is connected to the terminal structure 20. Proper connection is assured because of the key 23 and the slot 24.

Figure 8:
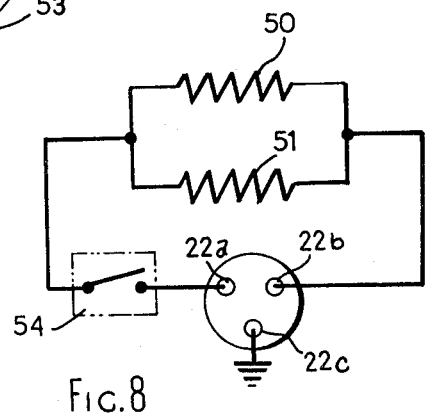
FIGURE 8 shows an electrical circuit for the heater elements and thermostat of FIGURE 6 when connected in a different configuration.

If the heater assembly 12 is to operate from conventional 115 volts, 60 cycle alternating current power, the heater elements 50, 51 may be connected in parallel as shown in FIGURE 8. The parallel elements 50, 51 are connected in series with the thermostat 54 between two appropriate terminal members 22a, 22b which will be supplied with 115 volt 60 cycle power. The third terminal member 22c may be connected to the metal of the assembly 12 for grounding. It is to be understood that heater elements having 230 volt ratings may be connected as shown in FIGURE 8 for use with a 230 volt power source.

The heater assembly shown and described is relatively simple and inexpensive to manufacture. The rectangular, elongated metal pipe can be easily bent without crimping or damaging its inner or outer surfaces. The heater element may be placed in the leg members, and wires brought through the opening in the cross-member for connection of the members of the terminal structure. The terminal structure may then be suitably fastened or sealed to the cross-member, and the sealing blocks may be suitably sealed or fastened in the ends of the leg members. Thus, the assembly is easily manufactured and provides a sealed structure that is impervious to moisture, liquids, or other foreign matter. The heater assembly may be easily installed in a cart, by simply placing the ring of the terminal structure through an opening in one cart wall. This opening may have a gasket. This ring provides locating guidance for the heater assembly, and also seals the opening in the cart against any material that might escape or enter through the opening. The assembly may also be easily removed. The assembly may be positioned only by the ring of the terminal structure, or may have locating tabs at various points on the U-shaped structure. And, electrical connections are easily provided to the terminal structure by blind manipulation, since the terminal structure is provided with a key for the slot in the connection. And, because of the novel U-shaped configurations, heat is efficiently provided for the cart, since the heat is supplied at the outside walls. In this connection, the location of the assembly as shown in FIGURE 1 provides very efficient and uniform heating, with no unusual hot spots or areas, since the sources of heat are provided by the two legs along the bottom of the opposite walls, and not at the rear.

While the invention has been described with reference to particular embodiments, persons skilled in the art will appreciate that modifications may be made. For example, the heater element may include more than the U-shaped or hairpin arrangement shown to provide more heat. And, the heater elements may be extended down into the cross-member rather than being restricted to the leg members as shown. And finally, the thermostat may be positioned in other locations, or may be eliminated. Therefore, while the invention has been described with reference to particular embodiments, it is to be understood that modifications may be made without departing from the spirit of the invention or from the scope of the claims.

I claim:

1. A removable, electrical heater assembly for enclosed chambers comprising:
   (a) a U-shaped housing formed of a hollow, closed metallic pipe, said housing having first and second generally parallel leg members joined at corresponding first ends thereof by a cross-member;
   (b) a first heating element positioned in the interior of said first parallel member along at least a part of the length thereof, said first element being electrically insulated from said first member;
   (c) a second heating element positioned in the interior of said second parallel member along at least a part of the length thereof, said second element being electrically insulated from said second member;
   (d) electrical terminals positioned in one wall of said cross-member for providing sealed electrical connections between the interior of said cross-member and an external circuit, said terminals being electrically insulated from said cross-member;
   (e) and means positioned in the interior of said cross-member of electrically connecting said first and second heating elements to said electrical terminals in a predetermined electrical circuit arrangement so that electrical power externally applied to said electrical terminals energizes said heating elements.

2. A removable, electrical heater assembly for enclosed chambers comprising:
   (a) a U-shaped structure of hollow metallic pipe, said structure having first and second generally parallel members joined at corresponding first ends thereof by a cross-member;
   (b) means for sealing the corresponding second ends of said parallel members:
   (c) a first heating element positioned in the interior of and insulated from said first parallel member, said first heating element extending along substantially the entire length of said first parallel member;
   (d) a second heating element positioned in the interior of and insulated from said second parallel member, said second heating element extending along substantially the entire length of said second parallel member;
   (e) electrical terminals positioned in an outward facing wall of and insulated from said cross-member for providing sealed electrical connections between the interior of said cross-member and an external circuit;
   (f) and means positioned in the interior of said cross-member for electrically connecting said first and second heating elements to said electrical terminals in a predetermined electrical circuit arrangement so that electrical power externally applied to said electrical terminals energizes said heating elements.

3. The heater assembly defined in claim 2, wherein said means for electrically connecting said heating elements to said electrical terminals further comprises a thermostatic switch.

4. The electrical heater assembly defined in claim 2 wherein said hollow metallic pipe has a substantially rectangular cross-sectional shape.

5. The electrical heater assembly defined in claim 2 wherein a metallic, cylindrical ring is fastened to said outward facing wall of said cross-member around said electrical terminals for protecting said terminals and for positioning said assembly in a wall opening.

References Cited
UNITED STATES PATENTS

| | | | |
|---|---|---|---|
| 1,710,196 | 4/1929 | Simon | 219—318 X |
| 2,888,547 | 5/1959 | Saper | 219—544 X |
| 2,948,798 | 8/1960 | Ness | 219—387 |
| 3,150,251 | 9/1964 | Kinney | 219—523 |
| 3,304,407 | 2/1967 | Clark et al. | 219—435 |

BERNARD A. GILHEANY, *Primary Examiner.*

VOLODYMYR Y. MAYEWSKY, *Assistant Examiner.*